(12) United States Patent
Cheng et al.

(10) Patent No.: US 12,726,894 B2
(45) Date of Patent: Sep. 1, 2026

(54) RELAY SELECTION AND RE-SELECTION ASSISTED BY DISCOVERY INFORMATION

(71) Applicant: QUALCOMM Incorporated, San Diego, CA (US)

(72) Inventors: Peng Cheng, Beijing (CN); Karthika Paladugu, San Diego, CA (US)

( * ) Notice: Subject to any disclaimer, the term of this patent is extended or adjusted under 35 U.S.C. 154(b) by 318 days.

(21) Appl. No.: 18/006,825

(22) PCT Filed: Sep. 30, 2020

(86) PCT No.: PCT/CN2020/119525
§ 371 (c)(1),
(2) Date: Jan. 25, 2023

(87) PCT Pub. No.: WO2022/067715
PCT Pub. Date: Apr. 7, 2022

(65) Prior Publication Data
US 2023/0292233 A1 Sep. 14, 2023

(51) Int. Cl.
*H04W 48/20* (2009.01)
*H04W 8/00* (2009.01)

(52) U.S. Cl.
CPC .......... *H04W 48/20* (2013.01); *H04W 8/005* (2013.01)

(58) Field of Classification Search
CPC ..... H04W 48/20; H04W 8/005; H04W 76/14; H04W 76/27; H04W 76/28; H04W 76/30; H04W 88/04
USPC .......... 370/329
See application file for complete search history.

(56) References Cited

U.S. PATENT DOCUMENTS 10,736,019 B2 8/2020 Bressanelli et al.
10,827,558 B2 11/2020 Gupta et al.
12,082,005 B2 * 9/2024 Zhang .......... H04W 52/0212
12,418,944 B2 * 9/2025 Dai .......... H04W 28/0958
2010/0080166 A1 * 4/2010 Palanki .......... H04B 7/15557 370/329
2010/0110974 A1 * 5/2010 Zhang .......... H04B 7/155 370/315
2013/0136131 A1 * 5/2013 Hirai .......... H04L 12/12 370/392
2014/0133387 A1 * 5/2014 Wagner .......... H04B 7/15 370/315

(Continued)

FOREIGN PATENT DOCUMENTS

CN 106304257 A 1/2017
CN 107771410 A 3/2018

(Continued)

OTHER PUBLICATIONS

International Search Report and Written Opinion—PCT/CN2020/119525—ISA/EPO—Jul. 8, 2021.

(Continued)

*Primary Examiner* — Jean A Gelin

(57) ABSTRACT

Certain aspects of the present disclosure provide techniques for relay selection and reselection based on discovery information. An example method generally includes receiving, from a network entity, relay selection assistance information identifying a plurality of relay UEs available for selection by the UE; selecting a first relay UE of the plurality of relay UEs based, at least in part, on the relay selection assistance information; and connecting, via a sidelink, to the selected first relay UE.

18 Claims, 19 Drawing Sheets

(56) References Cited

U.S. PATENT DOCUMENTS

| | | | | |
|---|---|---|---|---|
| 2015/0271765 | A1 | 9/2015 | Hakola et al. | |
| 2016/0192439 | A1* | 6/2016 | Phuyal | H04L 1/08 370/315 |
| 2016/0286374 | A1 | 9/2016 | Baghel et al. | |
| 2016/0337954 | A1 | 11/2016 | Gulati et al. | |
| 2017/0086114 | A1* | 3/2017 | Jung | H04W 36/08 |
| 2018/0069664 | A1* | 3/2018 | Khoryaev | H04L 1/1621 |
| 2018/0115940 | A1 | 4/2018 | Abedini et al. | |
| 2018/0139794 | A1* | 5/2018 | Chae | H04W 56/002 |
| 2018/0227736 | A1* | 8/2018 | Lee | H04W 76/10 |
| 2020/0008127 | A1* | 1/2020 | Ohtsuji | H04W 4/70 |
| 2020/0008183 | A1* | 1/2020 | Chen | H04W 72/20 |
| 2020/0059848 | A1* | 2/2020 | Lee | H04W 40/10 |
| 2020/0221532 | A1 | 7/2020 | Jung et al. | |
| 2020/0305139 | A1* | 9/2020 | Xu | H04W 72/23 |
| 2020/0374857 | A1* | 11/2020 | Zeng | H04W 72/20 |
| 2020/0389900 | A1* | 12/2020 | Lee | H04W 72/53 |
| 2022/0007217 | A1* | 1/2022 | Mondal | H04W 76/18 |
| 2022/0167370 | A1* | 5/2022 | Chen | H04W 72/542 |
| 2022/0369186 | A1* | 11/2022 | Diao | H04W 40/248 |
| 2023/0180097 | A1* | 6/2023 | Zhang | H04W 40/02 370/315 |
| 2023/0247513 | A1* | 8/2023 | Paladugu | H04W 88/04 370/315 |
| 2023/0309009 | A1* | 9/2023 | Back | H04W 48/20 |
| 2024/0147497 | A1* | 5/2024 | Ashraf | H04W 76/19 |

FOREIGN PATENT DOCUMENTS

| | | | |
|---|---|---|---|
| CN | 108809897 | A | 11/2018 |
| EP | 3618391 | A1 | 3/2020 |
| WO | 2016163745 | A1 | 10/2016 |
| WO | 2019005283 | | 1/2019 |
| WO | 2019067179 | | 4/2019 |

OTHER PUBLICATIONS

LG Electronics Inc: “Introduction of 5G V2X With NR Sidelink”, 3GPP TSG-RAN WG2 Meeting #109-e, R2-2002264, Mar. 6, 2020 (Mar. 6, 2020), 18 Pages, the whole document.

Ericsson: “Overview of ProSe UE to Network Relay Service Continuity”, 3GPP TSG-RAN WG2 #89bis, R2-151147, 3rd Generation Partnership Project, Mobile Competence Centre, 650, Route Des Lucioles, F-06921 Sophia-Antipolis Cedex vol. RAN WG2, No. Bratislava, Slovakia, Apr. 20, 2015-Apr. 24, 2015, Apr. 19, 2015, pp. 1-10, XP050936124, p. 3-p. 8.

Supplementary European Search Report—EP20955740—Search Authority—Munich—Jun. 5, 2024.

* cited by examiner

RELAY SELECTION AND RE-SELECTION ASSISTED BY DISCOVERY INFORMATION

CROSS-REFERENCE TO RELATED APPLICATIONS

This application is a national stage application under 35 U.S.C. 371 of PCT/CN2020/119525, filed Sep. 30, 2020, which is hereby assigned to the assignee hereof and hereby expressly incorporated by reference in its entirety as if fully set forth below and for all applicable purposes.

FIELD OF THE DISCLOSURE

Aspects of the present disclosure relate to wireless communications, and more particularly, to techniques for relay selection and re-selection assisted by network-provided discovery information.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE.

As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a remote user equipment (UE). The method generally includes receiving, from a network entity, relay selection assistance information identifying a plurality of relay user equipments (UEs) available for selection by the UE; selecting a first relay of the plurality of relay UEs based, at least in part, on the relay selection assistance information; and connecting, via a sidelink, to the selected first relay UE.

Certain aspects provide a method for wireless communication by a relay node. The method generally includes establishing, via a sidelink, a unicast connection with a remote UE; receiving, from the remote UE via the unicast connection, an indication to activate the unicast connection with the remote UE; and communicating via the unicast connection with the UE based on receiving the indication.

Certain aspects provide a method for wireless communication by a network entity. The method generally includes transmitting, to a remote user equipment (UE), relay selection assistance information identifying a plurality of relay UEs available for selection by the remote UE; and communicating with the remote UE via one of the plurality of relay UEs.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
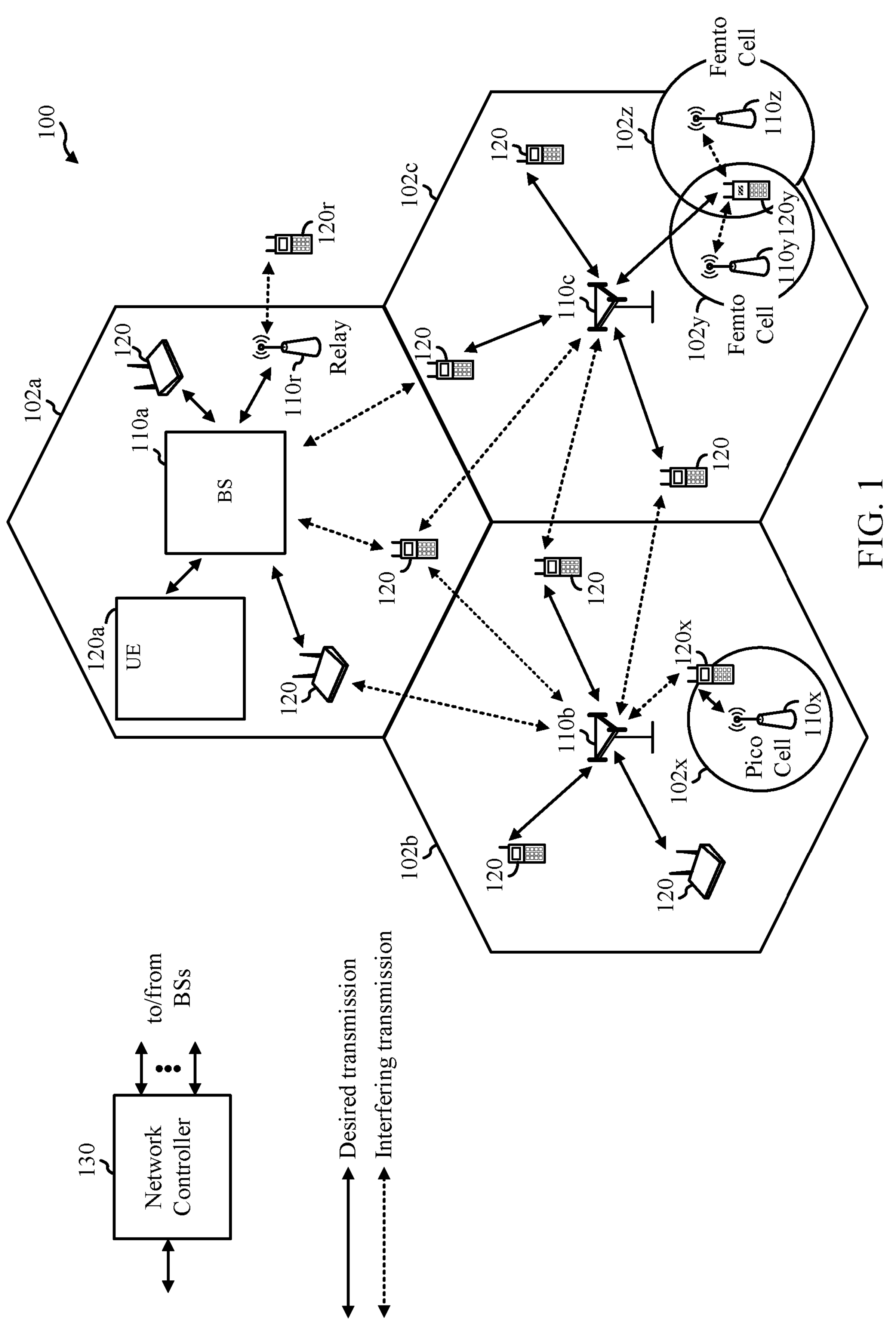
FIG. 1 is a block diagram conceptually illustrating an example telecommunications system, in accordance with certain aspects of the present disclosure.

Aspects of the present disclosure provide apparatus, methods, processing systems, and computer readable mediums for selecting and reselecting relay UEs in sidelink layer 2 (L2) and/or layer 3 (L3) relay systems based on discovery information.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

FIG. 1 illustrates an example wireless communication network 100 in which aspects of the present disclosure may be performed. For example, UEs 120*a* and/or BS 110*a* of FIG. 1 may be configured to perform operations 1100, 1200, and 1300 described below with reference to FIGS. 15, 16, and 17 to process paged communications in sidelink L2 relay scenarios.

As illustrated in FIG. 1, the wireless communication network 100 may include a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay UEs (e.g., relay UE 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
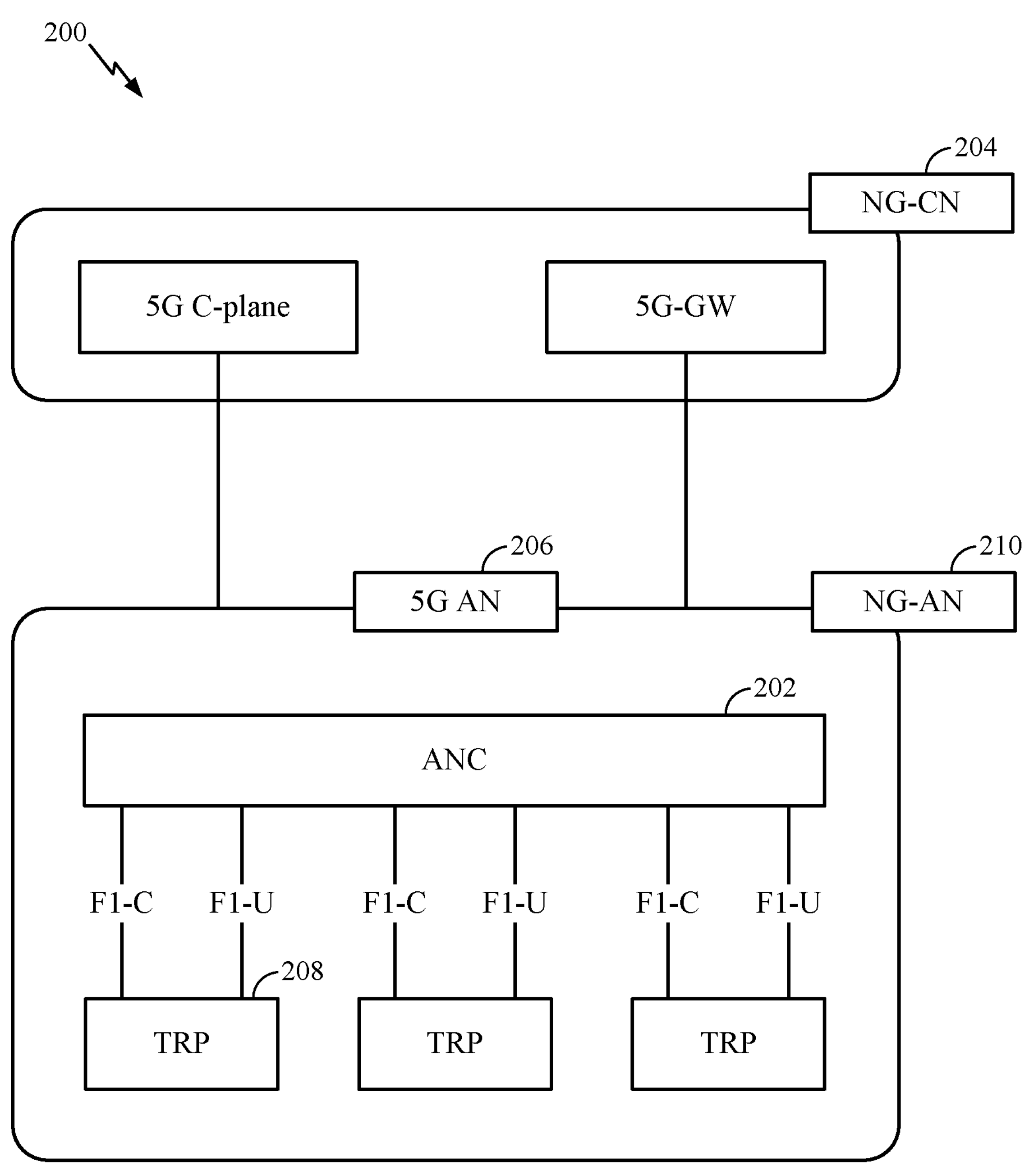
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
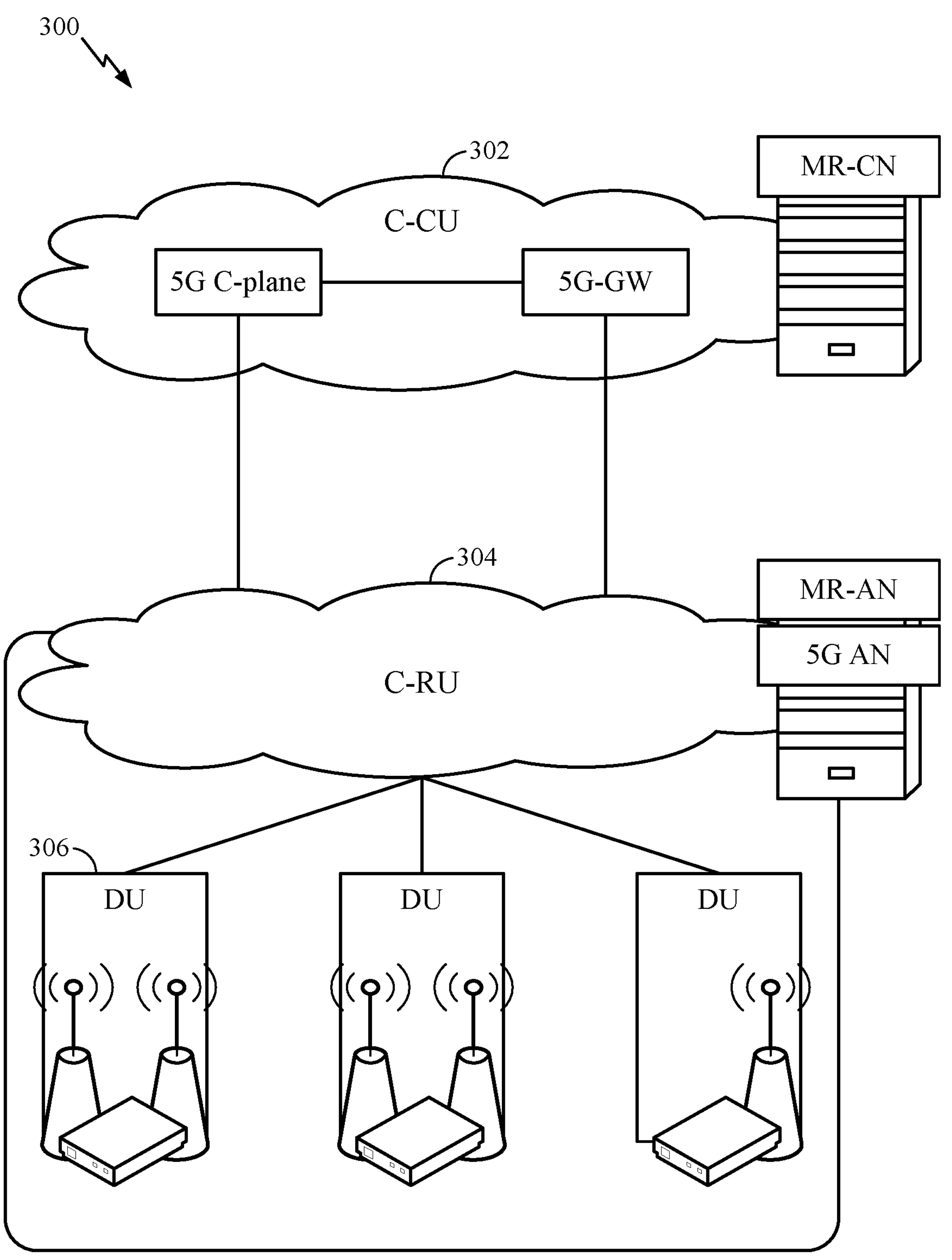
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
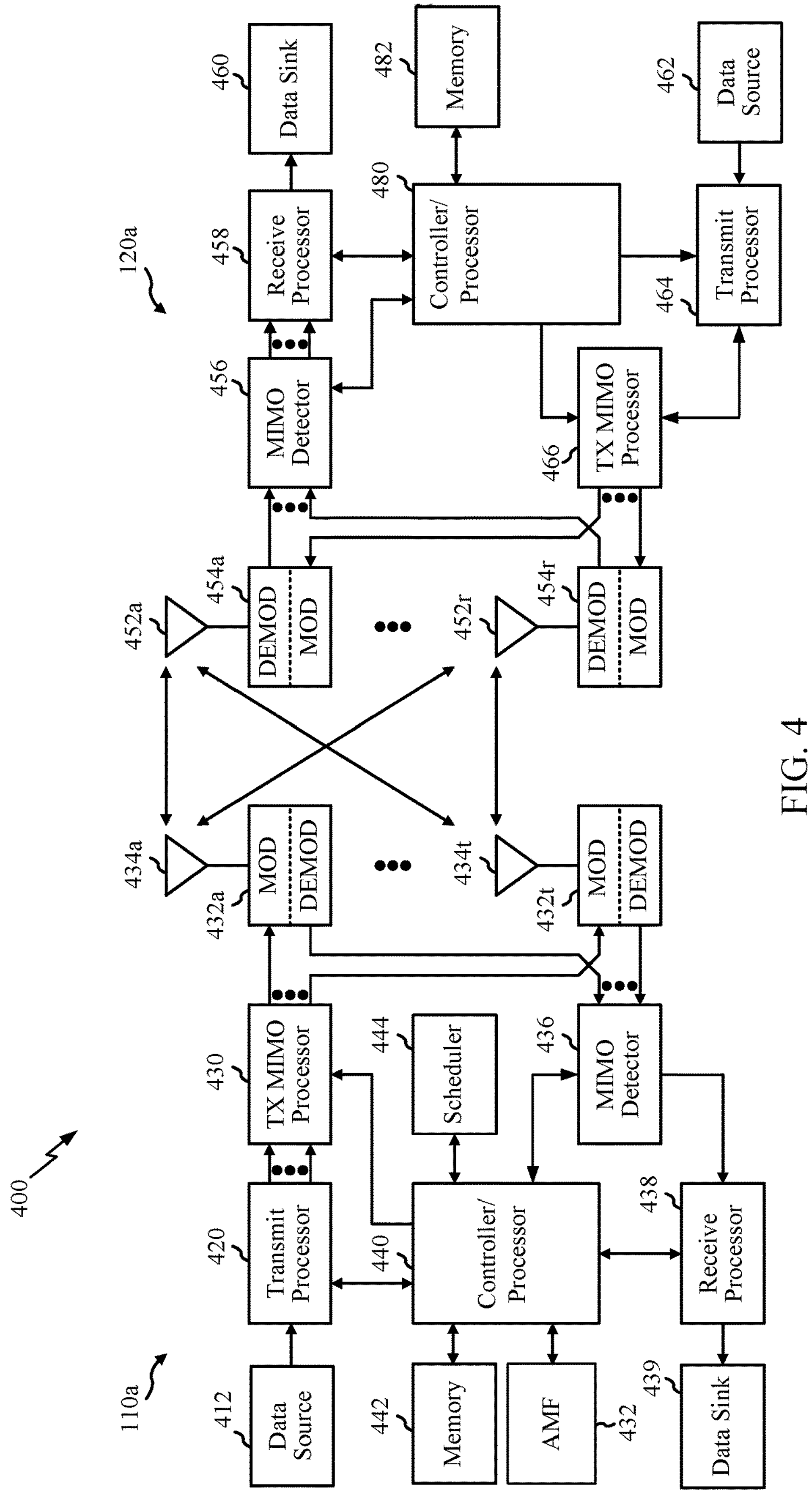
FIG. 4 is a block diagram conceptually illustrating a design of an example base station (BS) and user equipment (UE), in accordance with certain aspects of the present disclosure.

FIG. 4 illustrates example components of BS **110*a* and UE 120*a* (as depicted in FIG. 1), which may be used to implement aspects of the present disclosure. For example, antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein with reference to FIGS. 15, 16, and 17**.

At the BS **110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t***, respectively.

At the UE **120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454***a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein with reference to FIGS. 15, 16, and 17.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
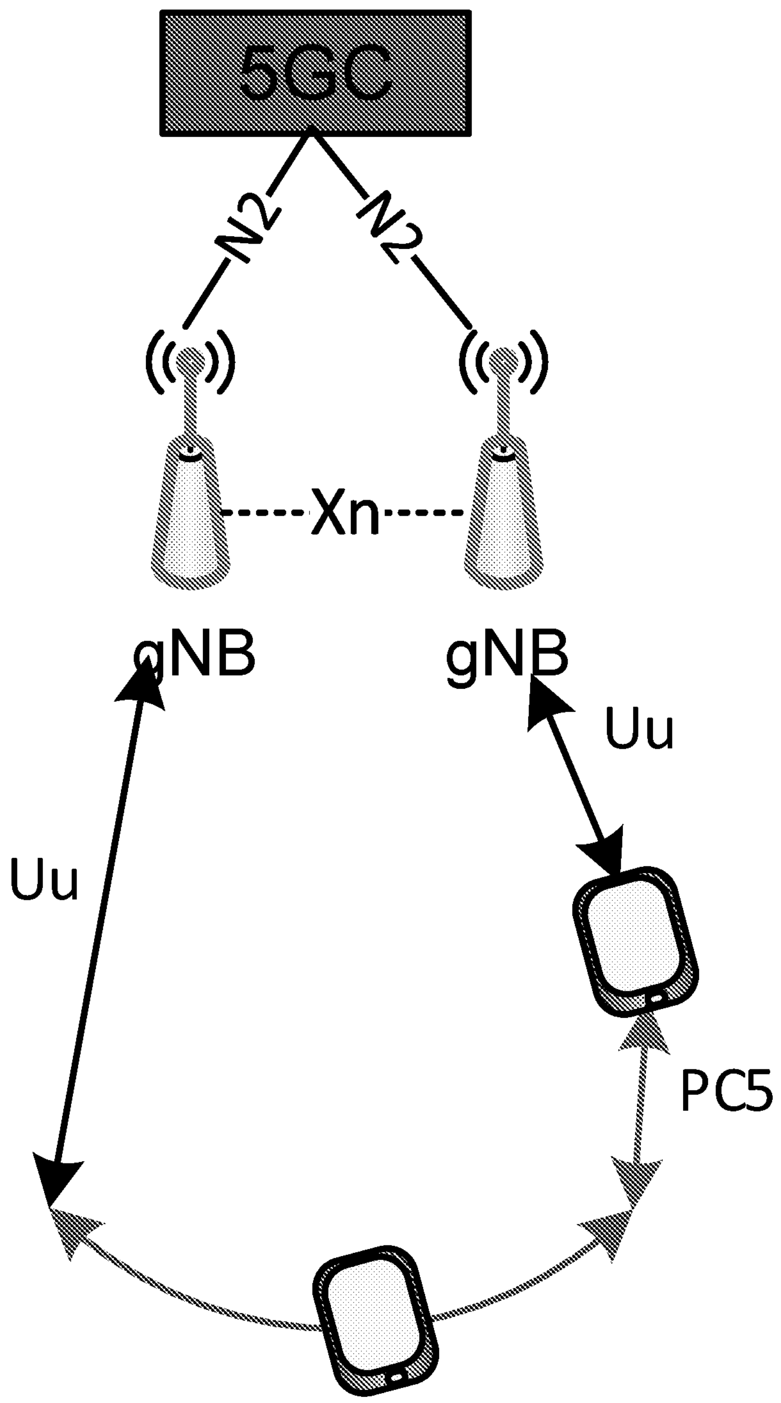
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
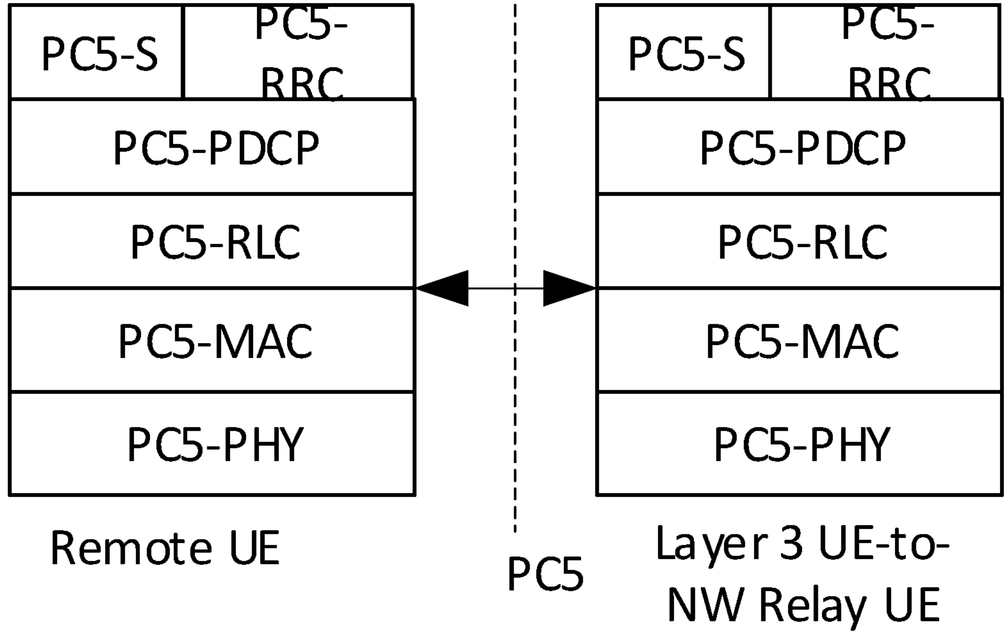
FIG. 6 is an example block diagram illustrating a control plane protocol stack on L3, when there is no direct connection path between the remote UE and the network node, in accordance with certain aspects of the present disclosure.
Figure 7:
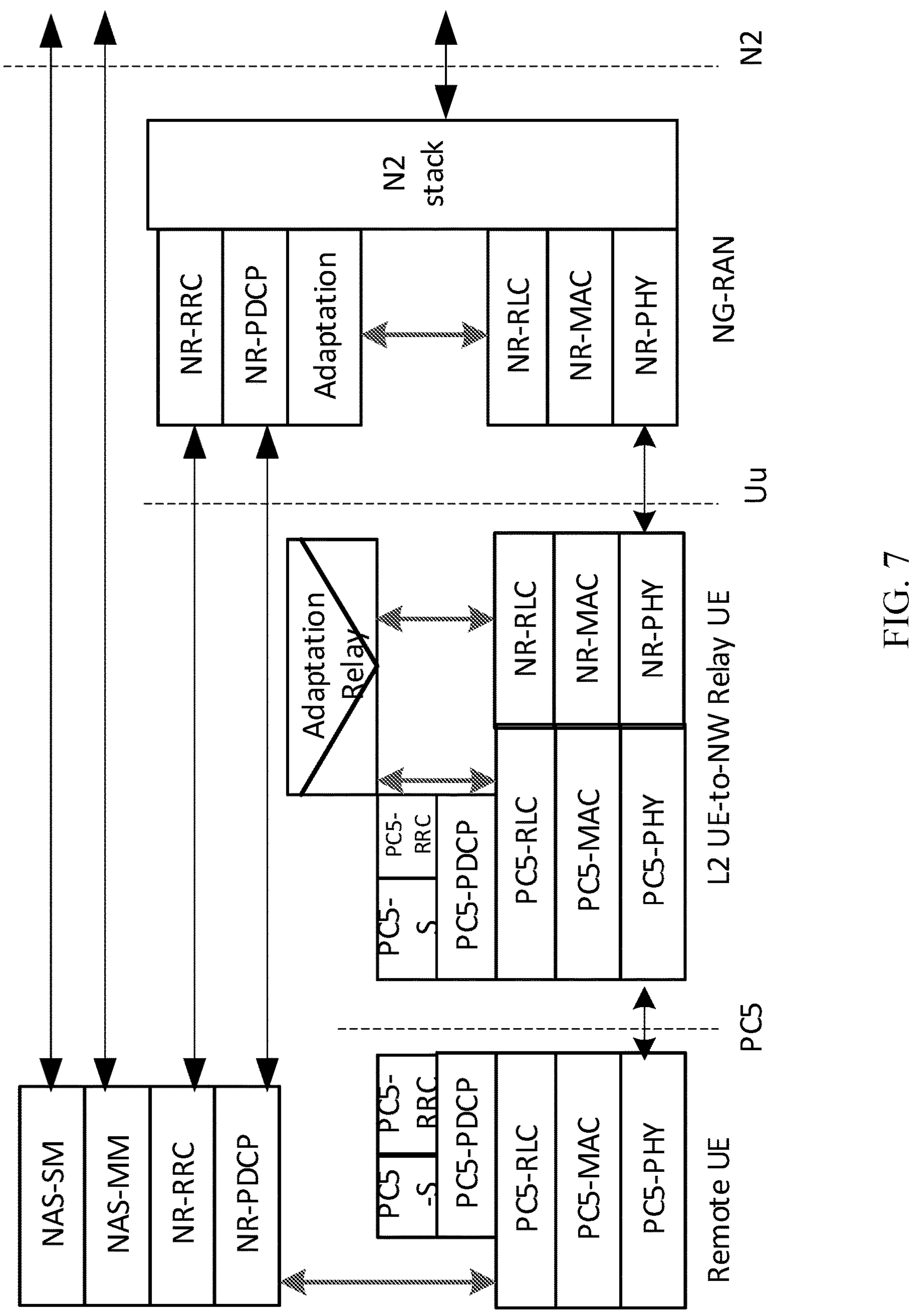
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Figure 8:
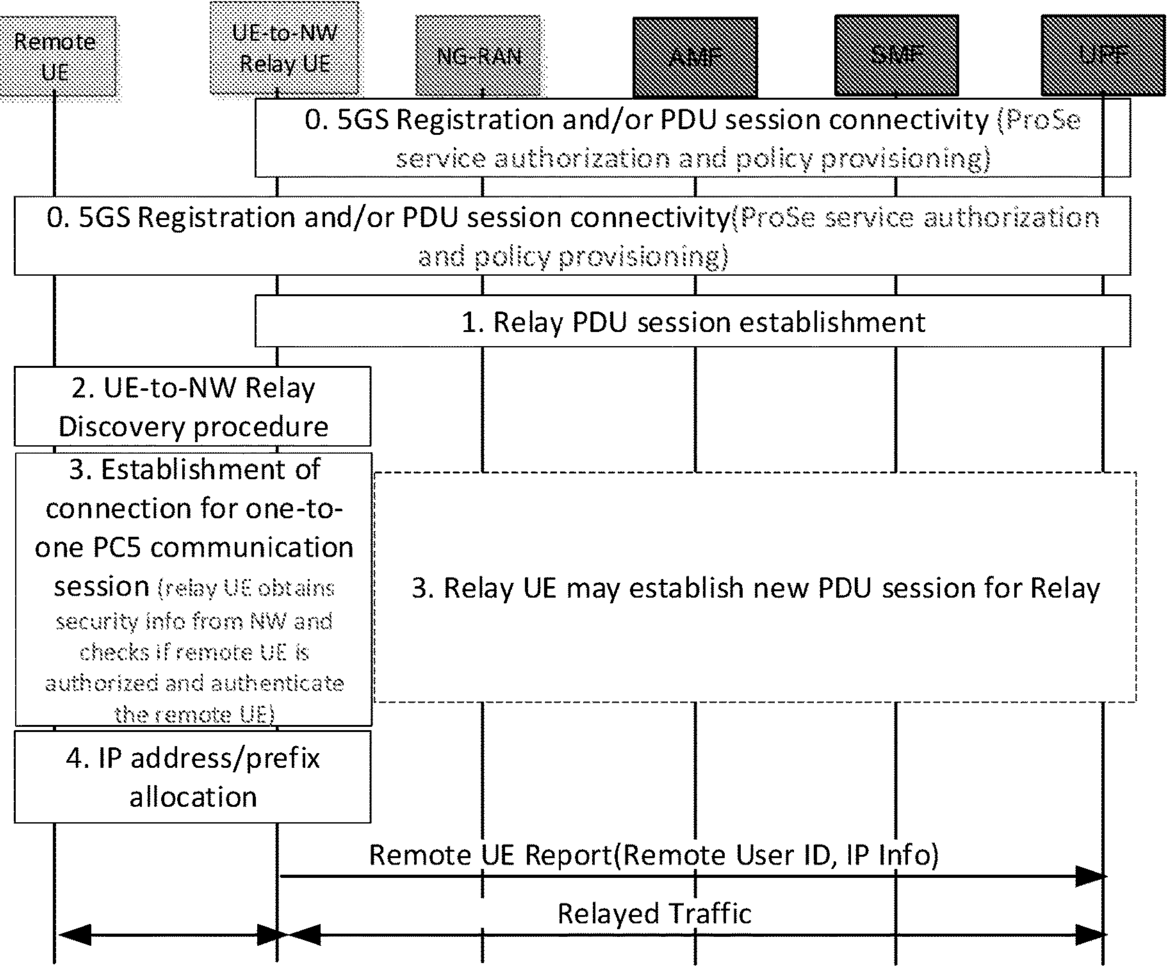
FIG. 8 illustrates example layer 3 (L3) relay procedures, in accordance with certain aspects of the present disclosure.

Particular relay procedures may depend on whether a relay is a L3 or L2 relay. FIG. 8 illustrates an example dedicated PDU session for an L3 relay. In the illustrated scenario, a remote UE establishes PC5-S unicast link setup and obtains an IP address. The PC5 unicast link AS configuration is managed using PC5-RRC. The relay UE and remote UE coordinate on the AS configuration. The relay UE may consider information from RAN to configure PC5 link. Authentication/authorization of the remote UE access to relaying may be done during PC5 link establishment. In the illustrated example, the relay UE performs L3 relaying.

Figure 9:
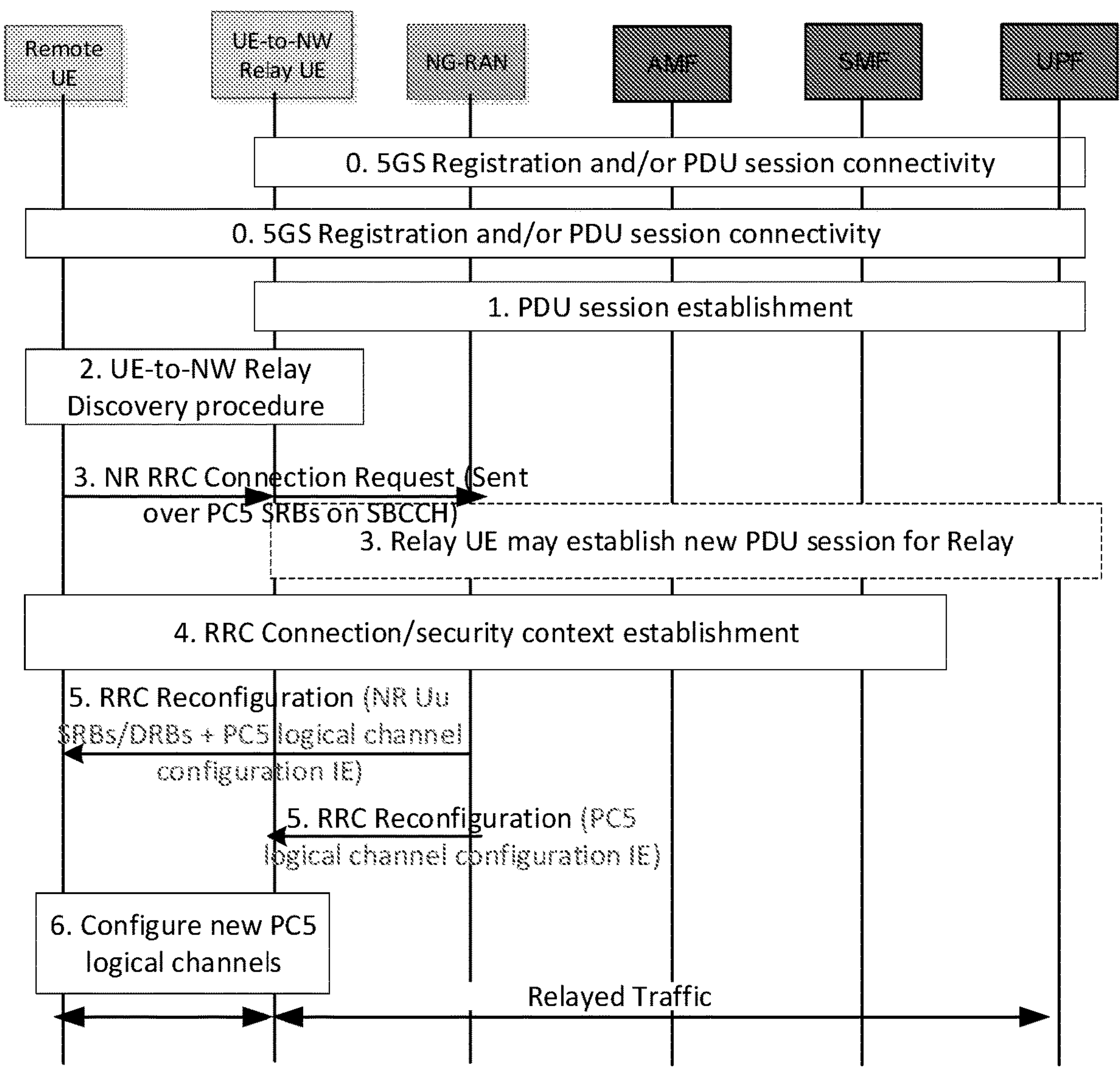
FIG. 9 illustrates example layer 2 (L2) relay procedures, in accordance with certain aspects of the present disclosure.

FIG. 9 illustrates an example dedicated PDU session for an L2 relay. In the illustrated scenario, there is no PC5 unicast link setup prior to relaying. The remote UE sends the NR RRC messages on PC5 signaling radio bearers (SRBs) over a sidelink broadcast control channel (SBCCH). The RAN can indicate the PC5 AS configuration to remote UE and relay UE independently via NR RRC messages. Changes may be made to NR V2X PC5 stack operation to support radio bearer handling in NR RRC/PDCP but support corresponding logical channels in PC5 link. In L2 relaying, PC5 RLC may need to support interacting with NR PDCP directly.

There are various issues to be addressed with sidelink relay DRX scenarios. One issue relates to support of a remote UE sidelink DRX for relay discovery. One assumption for relay discover in some cases is that the Relay UE is in CONNECTED mode only, rather than IDLE/INACTIVE. A remote UE, may be in a CONNECTED, IDLE/INACTIVE or out of coverage (OOC) modes.

Figure 10A:
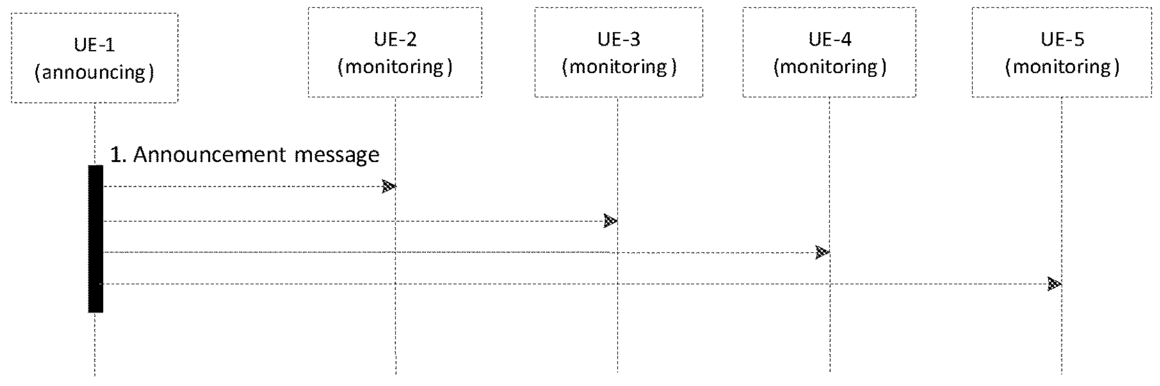
FIGS. 10A and 10B illustrate example relay discovery procedures.
Figure 10B:
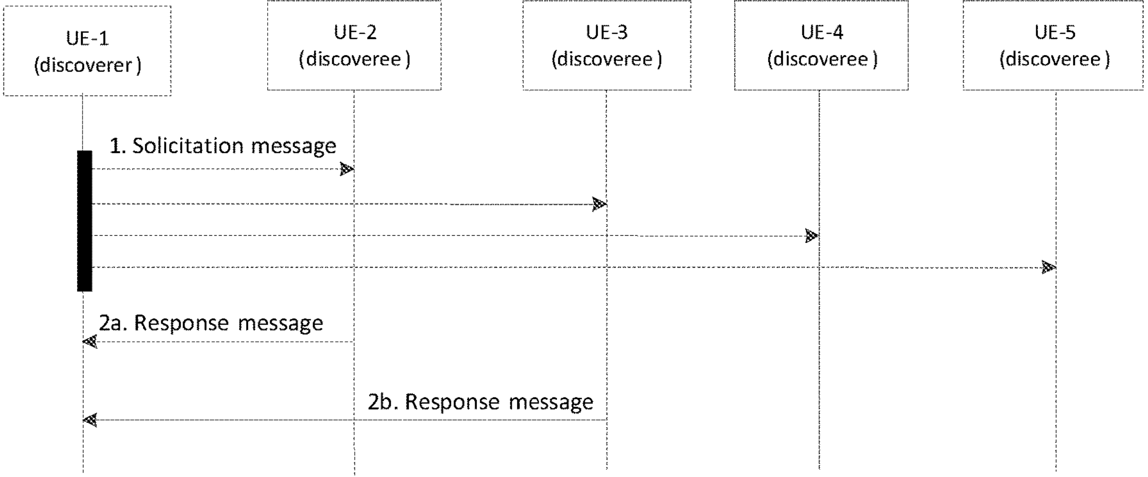

Discovery for both relay selection and reselection may be supported. Different type of discovery models may be supported. For example, a first model (referred to as Model A discovery) is shown in FIG. 10A. In this case, a UE sends discovery messages (an announcement) while other UEs monitor. According to a second model (referred to as Model B discovery) shown in FIG. 10B, a UE (discoverer) sends a solicitation message and waits for responses from monitoring UEs (discoverees). Such discovery messages may be sent on a PC5 communication channel (e.g., and not on separate discovery channel). Discovery messages may be carried within the same layer-2 frames as those used for other direct communication including, for example, the Destination Layer-2 ID that can be set to a unicast, groupcast or broadcast identifier, the Source Layer-2 ID that is always set to a unicast identifier of the transmitter, and the frame type indicates that it is a ProSe Direct Discovery message.

As noted above, for relay selection, the remote UE has not connected to any relay node (i.e. PC5 unicast link is not established between remote UE and relay node). In this case, it may be desirable to design DRX modes to reduce remote UE power consumption on monitoring relay discovery messages for relay selection.

As noted above, for relay reselection, the remote UE has connected to at least one relay node (e.g., with a PC5 unicast established between the emote UE and relay node). For relay reselection, it may be desirable to design a DRX configuration that helps reduce remote UE power consumption while monitoring for relay discovery messages for relay reselection and PC5 data transmission.

Figure 11:
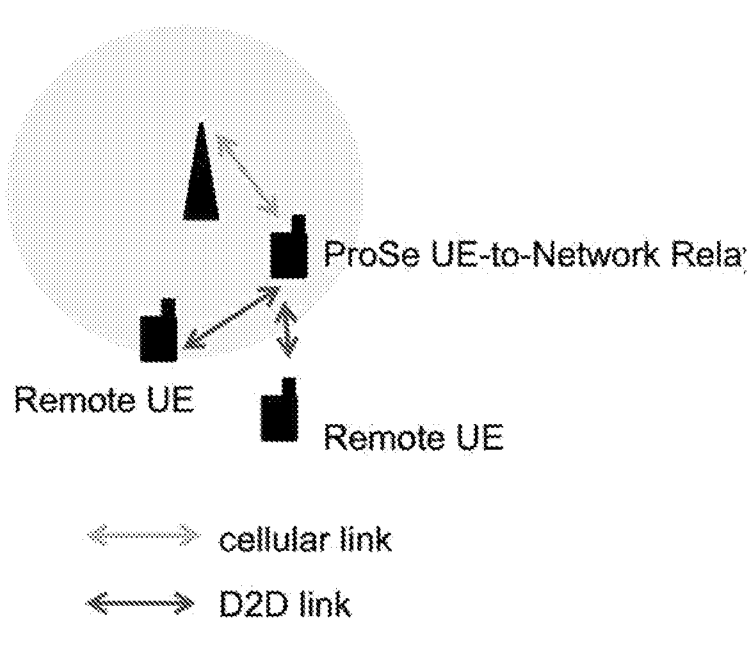
FIG. 11 illustrates an example communications environment in which a relay UE serves one or more remote UEs.

FIG. 11 illustrates an example environment in which remote UEs are served by a network entity through a UE-to-network relay (e.g., a relay UE). To communicate through a relay UE, a remote UE, which has not connected to a relay node, may discover relay nodes and select one or more of the relay nodes as the remote UE's relay. The remote UE may, for example, discover all relay nodes with a sidelink discovery reference signal received power (SD-RSRP) above a first threshold value (e.g., more than minHyst above q-Rx-LevMin). The remote UE may also reselect a relay when the remote UE is already connected with a relay node. To do so, the remote UE can determine that the sidelink RSRP (SL-RSRP) is below a second threshold value (e.g., more than minHyst below q-Rx-LevMin), and based on the determination, discover relay nodes having an SD-RSRP above the first threshold value.

Example Selection and Reselection of Relay UEs in Sidelink Layer 2 and Layer 3 Relay Systems Based on Discovery Information Aspects of the present disclosure provide apparatus, methods, processing systems, and computer readable mediums for selecting and reselecting relay UEs in sidelink L2 and L3 relay systems based on discovery information. As will be described, the techniques may enable a remote UE to quickly select and reselect relay UEs in response to changing states of network connections between the remote UE and the relay UE(s).

Figure 12A:
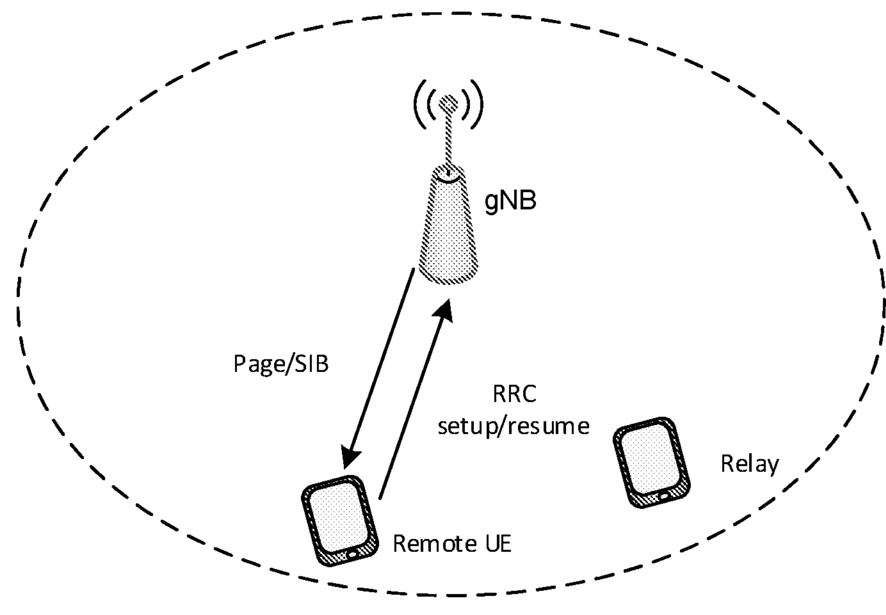
FIGS. 12A and 12B illustrate example scenarios in which a remote UE receives paging and system information blocks based on whether the remote UE is in or out of coverage of a network entity.
Figure 12B:
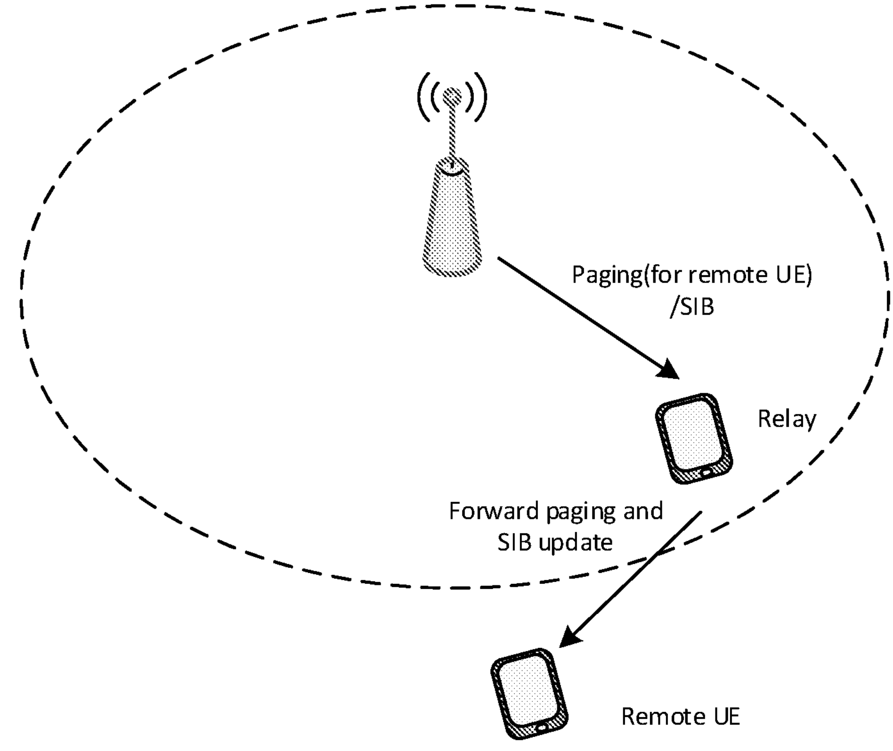

FIGS. 12A and 12B illustrate example scenarios in which a UE communicates with a network entity (e.g., a gNB). In both scenarios illustrated in FIGS. 12A and 12B, the relay UE is in coverage, and in one of an RRC Idle, Inactive, or Connected state. In the scenario illustrated in FIG. 12A, the remote UE is in coverage of the network entity. Because the remote UE is in coverage, the remote UE can receive paging and system information blocks (SIBs) directly from the network entity via the Uu link. However, in the scenario illustrated in FIG. 12B, the remote UE may be out of coverage of the network entity. Because the remote UE is out of coverage, and the relay UE is in coverage, the remote UE may connect with the relay UE and receive paging and SIBs from the network entity via the relay UE.

Figure 13:
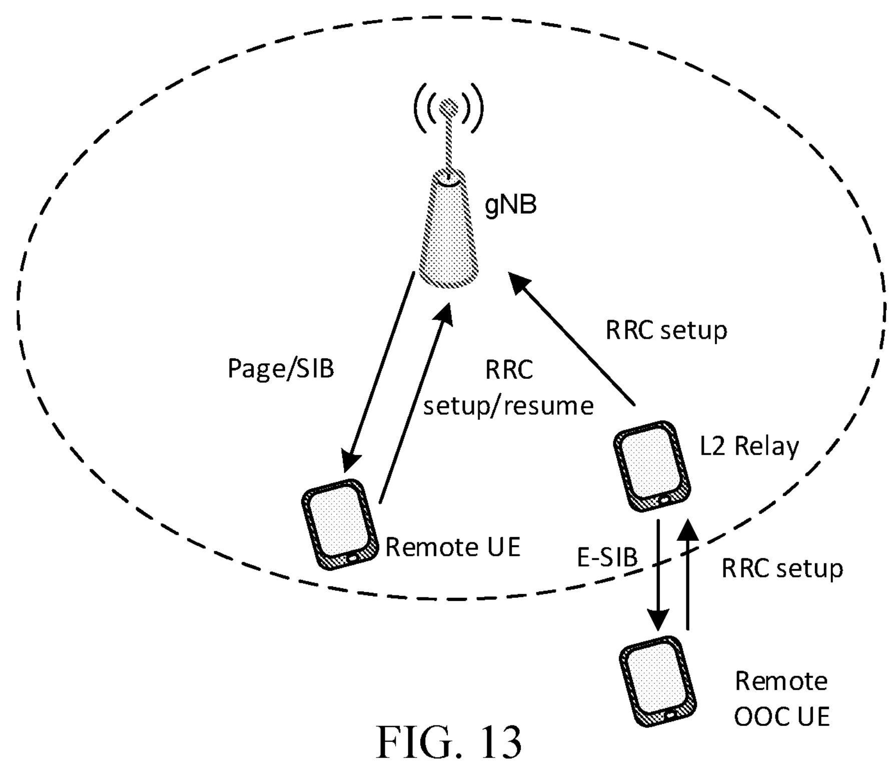
FIG. 13 illustrates example connection paths of a remote UE and paging prior to connecting with a relay.

FIG. 13 illustrates an example of paging by a remote UE prior to connecting with a relay UE. Before the remote UE connects with the relay UE, the UE may follow UE Idle or Inactive behavior as would be used were a remote UE connecting with a network entity. For example, the UE may perform idle mode measurements and cell (re) selection. Upon reception of Uu paging from a network entity, the UE can trigger unified access control (UAC) and radio resource configuration (RRC) setup or resumption, and can monitor the Uu connection for SIB updates. Remote UEs within coverage of a network entity may receive paging from the network entity; however, remote UEs outside of coverage of the network entity that are not connected with an in-coverage relay may not be able to receive paging and SIBs from the network entity.

Figure 14:
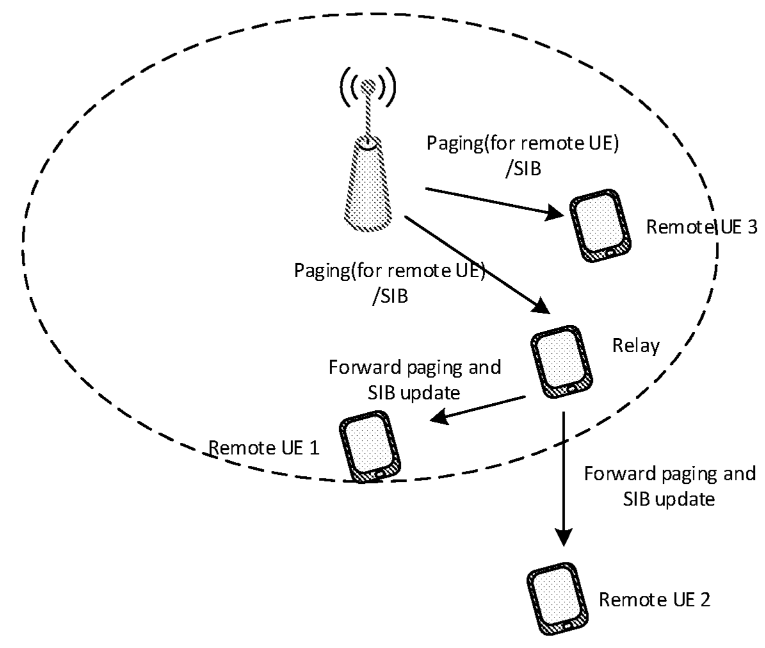
FIG. 14 illustrates example connection paths between remote UEs and relays after remote UEs connect with a relay.

FIG. 14 illustrates an example of paging by a remote UE after connecting with a relay (e.g., after a PC5 RRC connection is established). The remote UE can be configured by a gNB in one of a plurality of paging modes. In direct paging, a remote UE may monitor Uu paging and SIB updates. Direct paging may be a default mode that a remote UE applies if no signaling is received that indicates the paging mode to be used by the UE. Forward paging may allow the remote UE to forego monitoring for Uu paging or SIB updates; the relay UE, instead, monitors the remote UE's paging and forwards the remote UE's paging to the remote UE. Adaptive paging may allow for switching between direct and forward paging based on a request by the remote UE. Finally, a remote UE can be configured in a no-paging mode in which neither the remote UE nor the relay UE monitors Uu paging and/or SIB updates for the remote UE. Generally, the remote paging mode may be configured on a per-remote-UE basis, as illustrated in FIG. 14. For example, remote UE 3 may directly monitor Uu paging, while remote UEs 1 and 2, which are connected with the relay UE, may rely on paging forwarding.

Figure 15:
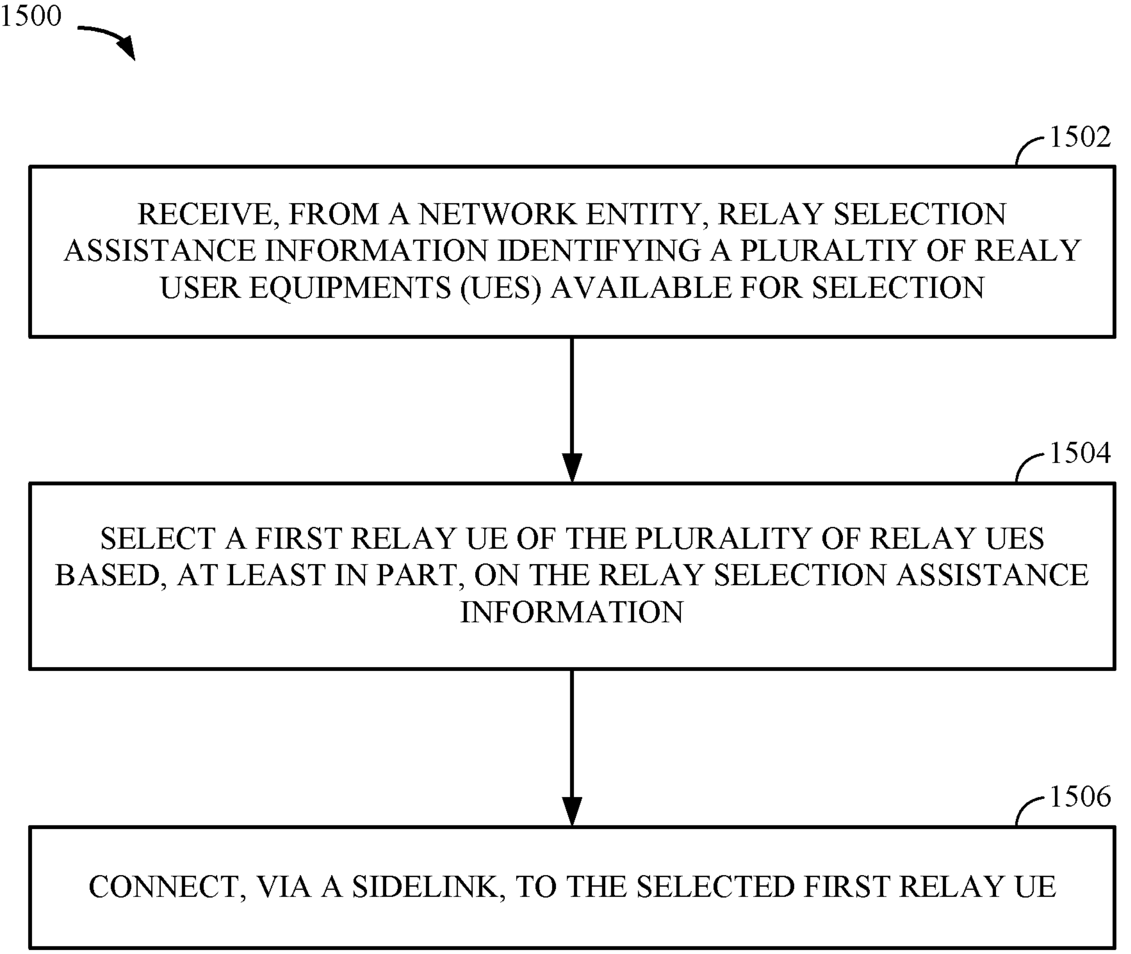
FIG. 15 is a flow diagram illustrating example operations that may be performed by a remote UE, in accordance with certain aspects of the present disclosure.
Figure 16:
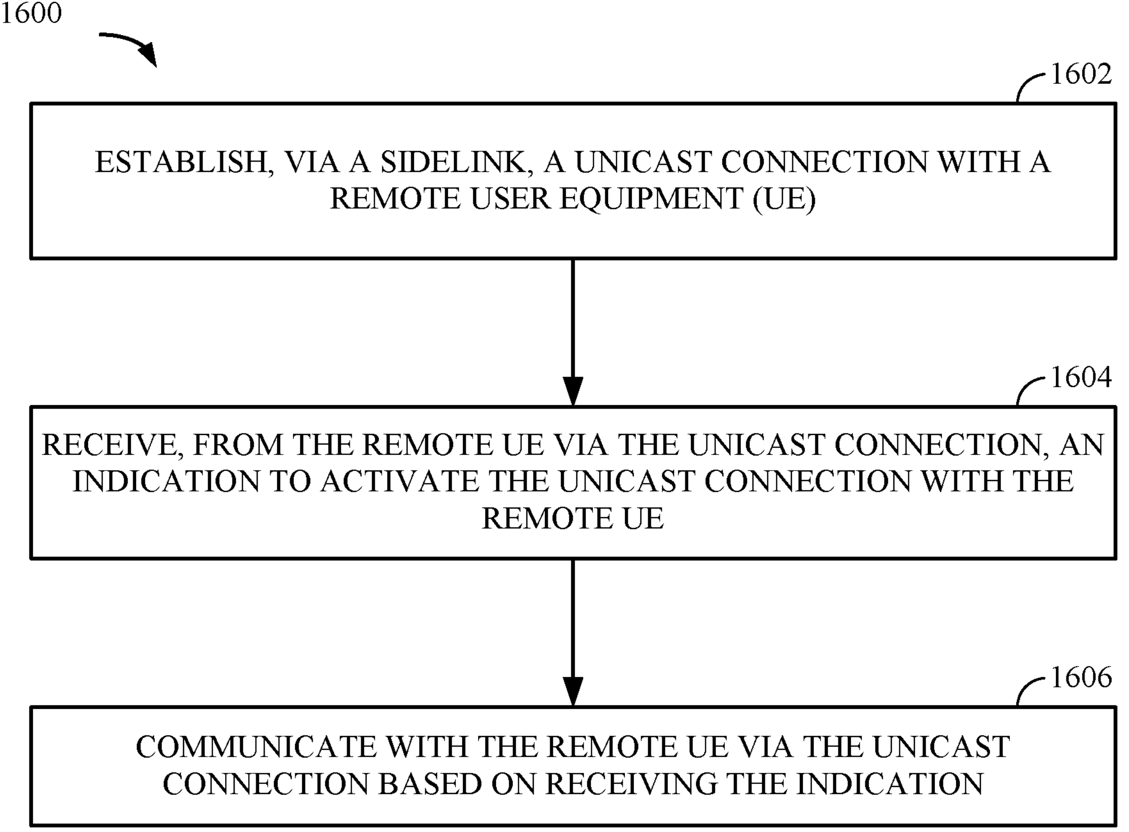
FIG. 16 is a flow diagram illustrating example operations that may be performed by a relay UE, in accordance with certain aspects of the present disclosure.
Figure 17:
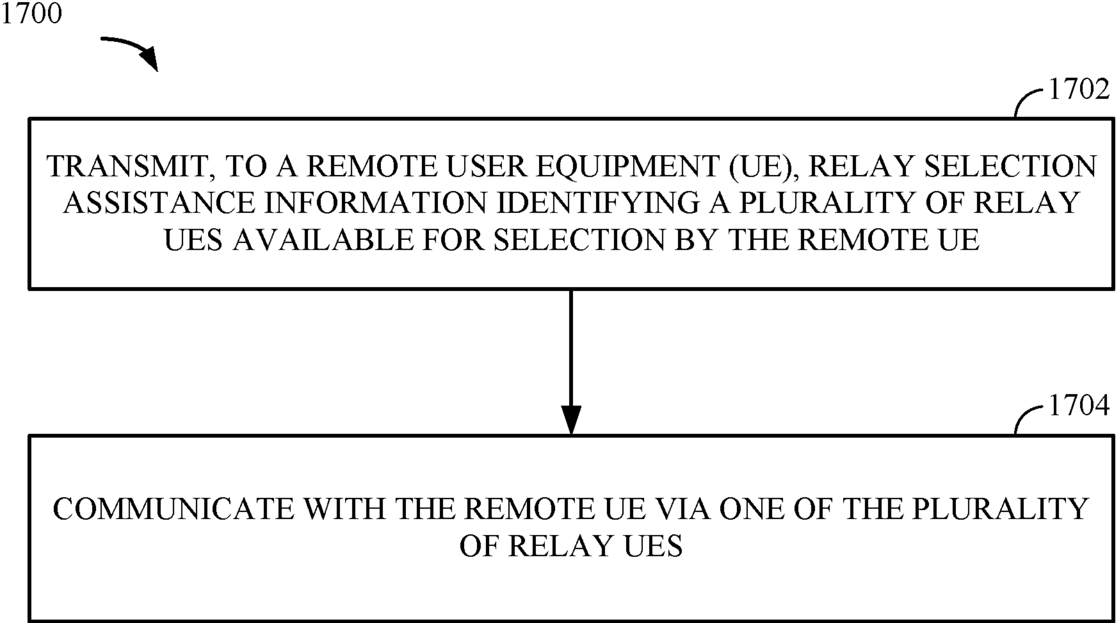
FIG. 17 is a flow diagram illustrating example operations that may be performed by a network entity, in accordance with certain aspects of the present disclosure.

Aspects of the present disclosure may allow for remote UEs to select and reselect relay UEs in sidelink L2 or L3 relay systems based on discovery information. FIGS. 15, 16, and 17 illustrate example operations from the perspective of a remote UE, relay UE, and network entity, respectively, for select and reselect relay UEs in sidelink L2 or L3 relay systems based on discovery information.

FIG. 15 illustrates example operations 1500 that may be performed by a remote UE to select and reselect relay UEs in sidelink L2 or L3 relay systems based on discovery information. As illustrated, operations 1500 begin at block 1502, where the remote UE receives, from a network entity, relay selection assistance information identifying a plurality of relay UEs available for selection by the UE.

At block 1504, the remote UE selects a first relay of the plurality of relay UEs based, at least in part, on the relay selection assistance information.

At block 1506, the remote UE connects, via a sidelink, to the selected first relay UE.

FIG. 16 illustrates example operations 1600 that may be performed by a relay UE for fast selection and reselection by the remote UE based on discovery information. As illustrated, operations 1600 may begin at block 1602, where the relay UE establishes, via a sidelink, a unicast connection with a remote UE.

At block 1604, the relay UE receives, from the remote UE, an indication to activate the unicast connection with the remote UE.

At block 1606, the relay UE communicates via the unicast connection with the remote UE based on receiving the indication.

FIG. 17 illustrates example operations that may be performed by a network entity to configure a remote UE for selection and reselection of relay UEs based on discovery information. As illustrated, operations 1700 may begin at block 1702, where the network entity transmits, to the remote UE, relay selection assistance information identifying a plurality of relay UEs available for selection by the remote UE.

At block 1704, the network entity communicates with the remote UE via one of the plurality of relay UEs.

Generally, aspects described herein assist remote UEs in performing relay UE selection or reselection based on assistance information that may be provided to the remote UEs. The assistance information may aid a UE in selecting a relay UE by, for example, providing information about each of the available relay UEs that the remote UE can use to include or exclude relay UEs from a list of candidate relay UEs to which the remote UE can connect. Further, as discussed in further detail below, the assistance information may be used by the remote UE to establish unicast connections with a plurality of relay UEs, which may allow for the remote UE to quickly transition from communicating with one relay UE to communicating with another relay UE without waiting to establish a connection with the other relay UE.

The relay selection assistance information may be included in one or more of a discovery message, in a dedicated message transmitted by a network entity during a discovery procedure, or in a system information block (SIB) broadcast to the remote UE (and other UEs in a network) by a network entity.

In some aspects, the assistance information may comprise L2/L3 assistance information for UE-to-network relays. In such a case, the relay selection assistance information may be organized on a per-cell basis. The relay selection assistance information may include cell identifier information for each cell. The cell identifier information may include a cell ID, a physical cell ID (PCI) and a frequency on which the PCI is transmitted, a cell global identity (CGI), tracking area identity (TAI), or the like. In some aspects, the relay selection assistance information may include load information for each cell, which the UE may use to give preference to connecting via a sidelink to less heavily loaded cells over connecting via a sidelink to more heavily loaded cells. In some aspects, the relay selection assistance information may include quality of service (QOS) information for the cell. The QoS information may include, for example, a minimum QoS supported by a relay Uu link (e.g., a link between a relay UE and a network entity) and/or a minimum QoS supported by a relay PC5 link (e.g., a link between the remote UE and the relay UE). In some aspects, the relay selection assistance information may include neighbor relay information, such as a list of relay UEs associated with a cell and the corresponding frequencies for measurement, and a connection status of the relay UEs. The relay selection assistance information may include public land mobile network information associated with the cell. In some aspects, the relay selection assistance information may include relay selection and reselection parameters for each cell. The relay selection and reselection parameters may include, for example, a minimum reference signal received power (RSRP) in order for a cell to be a candidate cell, a minimum hysteresis value, a sidelink RSRP threshold value, or the like.

In some aspects, the assistance information may comprise L2/L3 assistance information for UE-to-UE relays. To aid a UE in performing relay reselection, the relay selection assistance information may be organized on a per-UE basis. For each UE, the relay selection assistance information may include identifiers of connected destination UEs. The relay selection assistance information may include, for example, a cell identifier of a cell associated with a relay UE, such as a PCI and frequency on which the PCI is transmitted, a CGI, a TAI, and the like. In some aspects, the relay selection assistance information may include cell load information for cells associated with the relay UE. The relay selection assistance information may include load information for each cell, which the UE may use to give preference to connecting via a sidelink to less heavily loaded cells over connecting via a sidelink to more heavily loaded cells. In some aspects, the relay selection assistance information may include quality of service (QOS) information for the cell. The QoS information may include, for example, a minimum QoS supported by a relay Uu link (e.g., a link between a relay UE and a network entity) and/or a minimum QoS supported by a relay PC5 link (e.g., a link between the remote UE and the relay UE). In some aspects, the relay selection assistance information may include neighbor relay information, such as a list of relay UEs associated with a cell and the corresponding frequencies for measurement, and a connection status of the relay UEs. The relay selection assistance information may include public land mobile network information associated with the cell. In some aspects, the relay selection assistance information may include relay selection and reselection parameters for each cell. The relay selection and reselection parameters may include, for example, a minimum reference signal received power (RSRP) in order for a cell to be a candidate cell, a minimum hysteresis value, a sidelink RSRP threshold value, or the like.

Generally, to select or re-select a relay UE, a remote UE may identify a suitable relay UE from a universe of relay UEs that are available for selection. A suitable relay UE may be, for example, a UE having a highest link quality on a sidelink connection between the remote UE and the relay UE and satisfying various higher layer criteria, which may be defined a priori. Generally, the universe of relay UEs that are available for selection may include relays associated with a same cell as the remote UE, as the context may remain the same for these relay UEs.

In some aspects, when a remote UE is in coverage of a network entity with which the remote UE communicates via a relay UE, radio resource management (RRM) procedures towards serving and neighbor network entities may be relaxed. In relaxing RRM procedures, a smaller number of measurement resources may be needed, and the UE may perform less frequent measurement (e.g., using a larger minimum periodicity). In some aspects, different relaxed RRM parameters may be used for the serving network entity and the neighboring network entities.

In some aspects, the remote UE may be in a connected (e.g., RRC-CONNECTED) mode. In such a case, radio link monitoring (RLM) parameters in respect of the serving network entity may be relaxed. Similarly to the relaxed RRM parameters discussed above, relaxation of RLM parameters may include using a smaller number of measurement resources and/or less frequent measurement.

In some aspects, a remote UE may communicate with a network entity via a multi-path relay. To select the relay UEs through which the remote UE communicates with the network entity, the remote UE may initially discover all relay UEs whose sidelink RSRP is above a minimum RSRP by a hysteresis value. Among these discovered relay UEs, the remote UE may select the relay node with the highest sidelink RSRP as the relay UE. The remote UE may also establish unicast sidelink RRC connections with the other discovered relay UEs, which may be considered "suitable" relay UEs. Sidelink connections with a selected relay UE may be activated by transmitting an indication in a sidelink radio resource control (RRC) or medium access control (MAC) control element (CE) (MAC-CE) from the remote UE. The selected relay UE may store an IP address and port number for relaying information to the remote UE upon reception of the indication, and the other sidelink connections may be deactivated.

In some aspects, the remote UE may perform sidelink RSRP measurements for certain sidelink connections to relay UEs. The remote UE may perform the sidelink RSRP measurements, for example, when the sidelink RSRP of the connection between the remote UE and the selected relay UE exceeds a sidelink RSRP threshold, or when the minimum sidelink RSRP of the relays with sidelink RRC connections exceeds an RSRP threshold. Otherwise, the remote UE may perform sidelink RSRP measurements for all discoverable relays and establish a new sidelink connection with a new relay UE.

When the connection between the selected relay UE and the remote UE becomes an unsuitable connection (e.g., the RSRP of the sidelink connection falls below an RSRP threshold value), the remote UE may release the corresponding sidelink connection. A sidelink RRC connection may be established between the relay UE and one of the other suitable relay UEs. The one of the other suitable relay UEs may be, for example, the relay UE with a sidelink connection having a best or highest RSRP, and the remote UE may connect with the remote UE via one of sidelink RRC signaling or sidelink MAC-CE signaling.

In some aspects, a remote UE may perform a path switch between a sidelink and a Uu link. For a remote UE that is connected to a relay and in a scenario in which at least one suitable relay is associated with the same cell, the remote UE may perform relay selection, but need not perform cell reselection. When no suitable relay UE is associated with the same cell, the remote UE may trigger a cell reselection procedure to establish a connection with a new cell (and, correspondingly, establish a new sidelink connection with a new relay UE using the techniques described herein).

Figure 18:
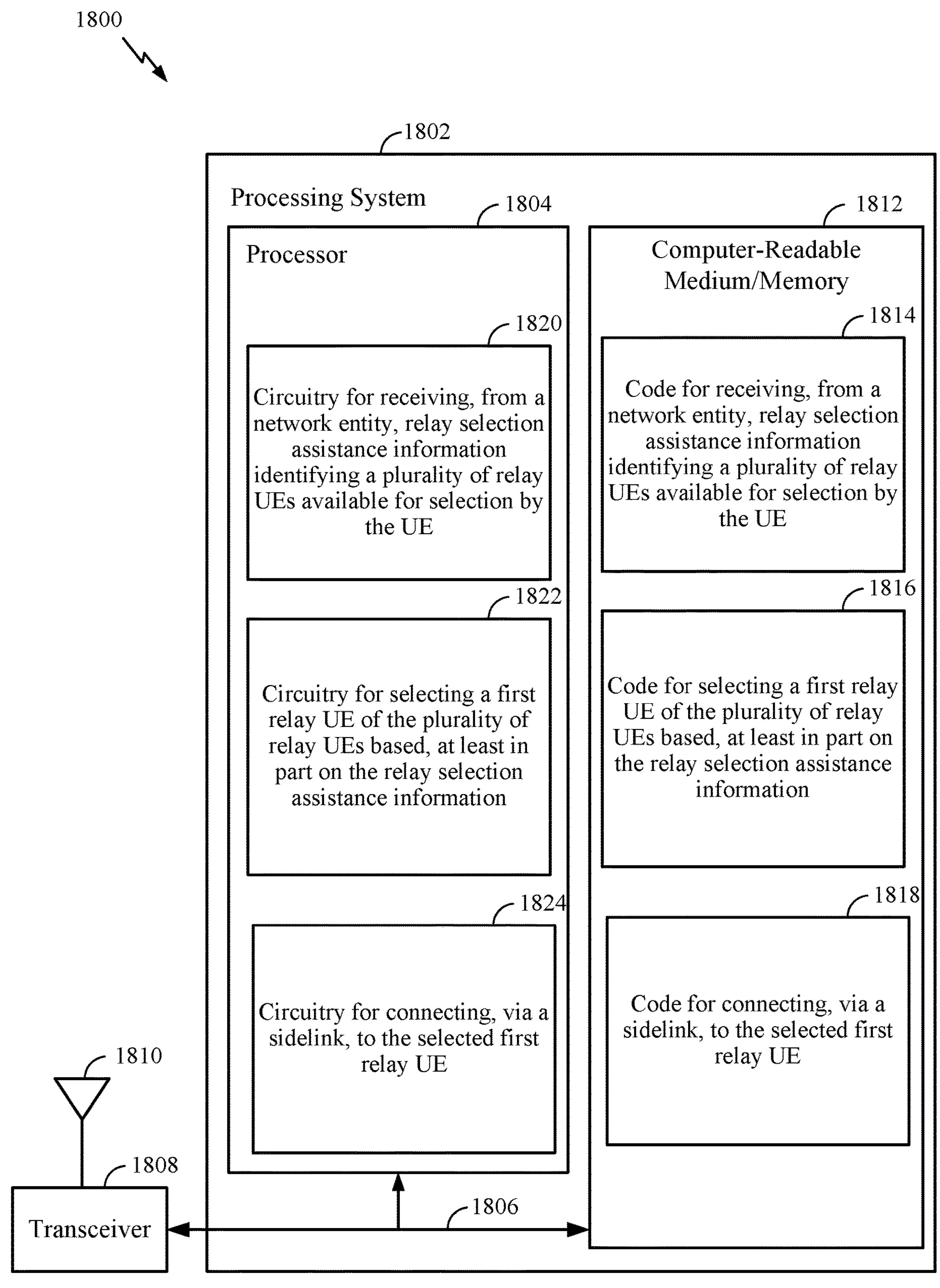
FIG. 18 illustrates a communications device that may include various components configured to perform the operations illustrated in FIG. 15, in accordance with certain aspects of the present disclosure.

FIG. 18 illustrates a communications device 1800 that may include various components (e.g., corresponding to means-plus-function components) configured to perform operations for the techniques disclosed herein, such as the operations illustrated in FIG. 15. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 15, or other operations for selecting and reselecting relay UEs in sidelink L2 or L3 relay systems based on discovery information. In certain aspects, computer-readable medium/memory 1812 stores code 1814 for receiving, from a network entity, relay selection assistance information identifying a plurality of relay UEs available for selection by the UE; code 1816 for selecting a first relay UE of the plurality of relay UEs based, at least in part, on the relay selection assistance information; and code 1818 for connecting, via a sidelink, to the selected first relay UE. In certain aspects, the processor 1804 has circuitry configured to implement the code stored in the computer-readable medium/memory 1812. The processor 1804 includes circuitry 1820 for receiving, from a network entity, relay selection assistance information identifying a plurality of relay UEs available for selection by the UE; circuitry 1822 for selecting a first relay UE of the plurality of relay UEs based, at least in part, on the relay selection assistance information; and circuitry 1824 for connecting, via a sidelink, to the selected first relay UE.

Figure 19:
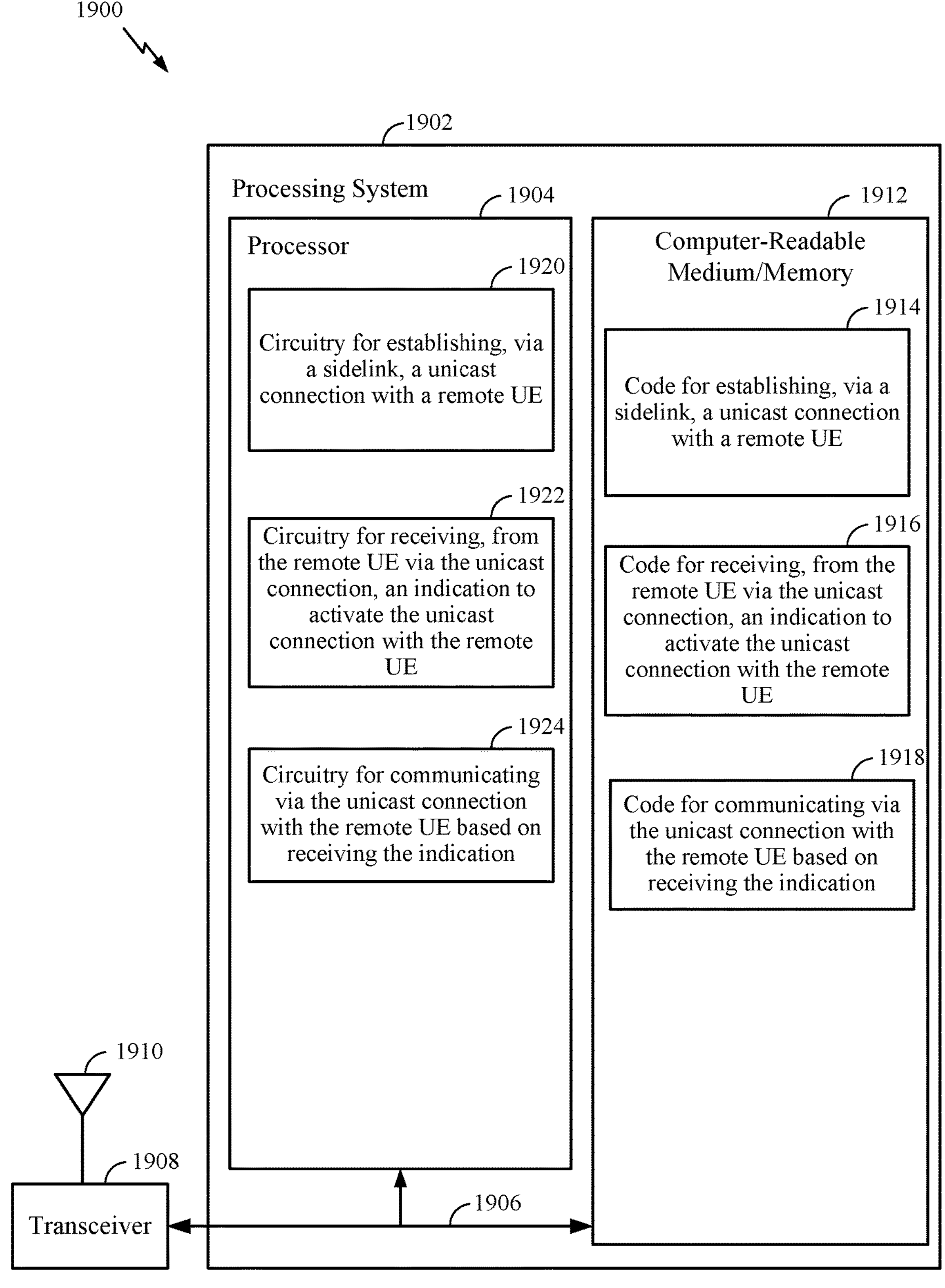
FIG. 19 illustrates a communications device that may include various components configured to perform the operations illustrated in FIG. 16, in accordance with certain aspects of the present disclosure.

FIG. 19 illustrates a communications device 1900 that may include various components (e.g., corresponding to means-plus-function components) configured to perform operations for the techniques disclosed herein, such as the operations illustrated in FIG. 16. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 16, or other operations for fast selection and reselection by the remote UE based on discovery information. In certain aspects, computer-readable medium/memory 1912 stores code 1914 for establishing, via a sidelink, a unicast connection with a remote UE; code 1916 for receiving, from the remote UE via the unicast connection, an indication to activate the unicast connection with the remote UE; and code 1918 for communicating via the unicast connection with the remote UE based on receiving the indication. In certain aspects, the processor 1904 has circuitry configured to implement the code stored in the computer-readable medium/memory 1912. The processor 1904 includes circuitry 1920 for establishing, via a sidelink, a unicast connection with a remote UE; circuitry 1922 for receiving, from the remote UE via the unicast connection, an indication to activate the unicast connection with the remote UE; and circuitry 1924 for communicating via the unicast connection with the remote UE based on receiving the indication.

Figure 20:
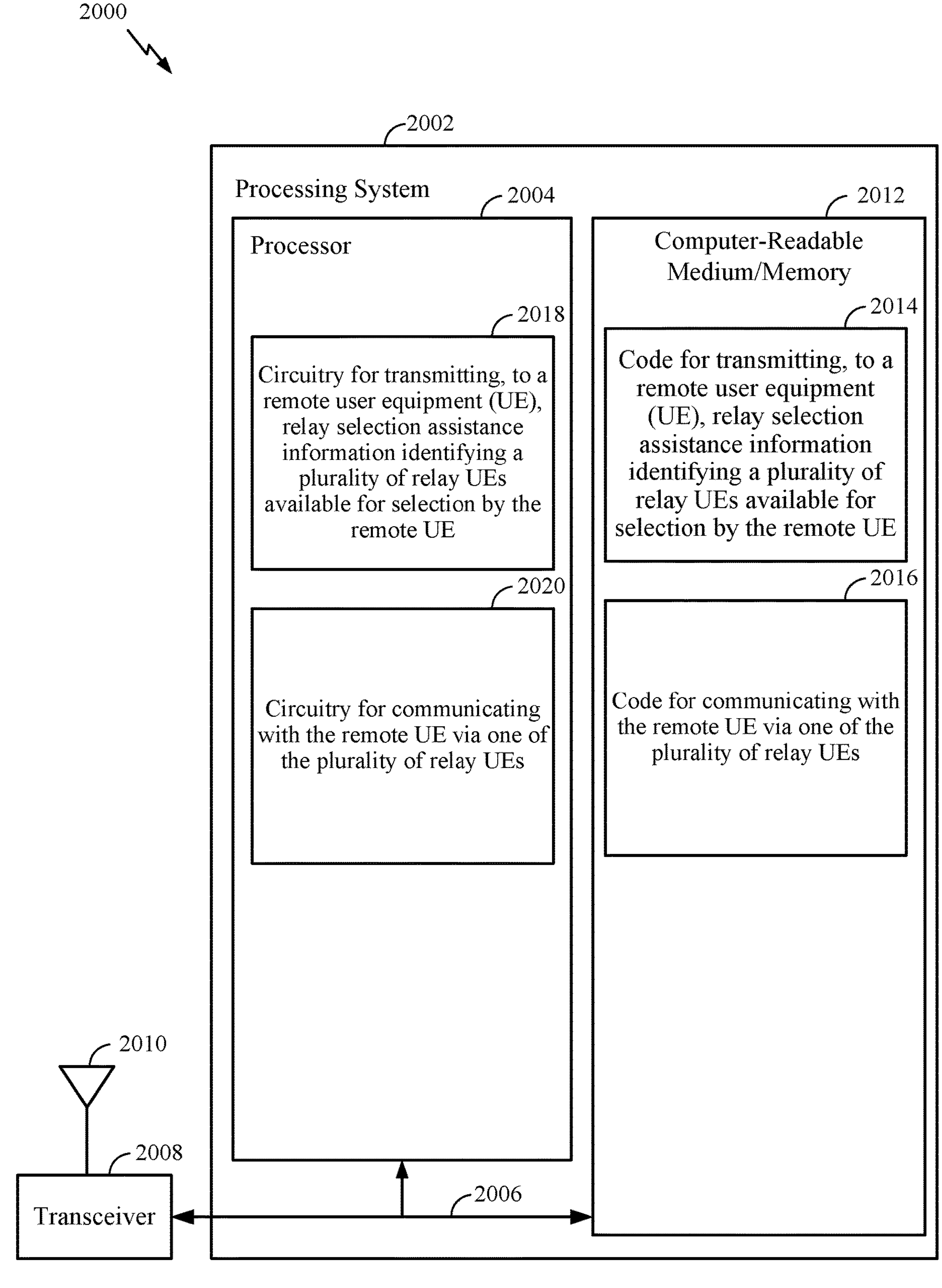
FIG. 20 illustrates a communications device that may include various components configured to perform the operations illustrated in FIG. 17, in accordance with certain aspects of the present disclosure.

FIG. 20 illustrates a communications device 2000 that may include various components (e.g., corresponding to means-plus-function components) configured to perform operations for the techniques disclosed herein, such as the operations illustrated in FIG. 17. The communications device 2000 includes a processing system 2002 coupled to a transceiver 2008. The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the operations illustrated in FIG. 17, or other operations for configuring a remote UE for selection and reselection of relay UEs based on discovery information. In certain aspects, computer-readable medium/memory 2012 stores code 2014 for transmitting, to a remote user equipment (UE), relay selection assistance information identifying a plurality of relay UEs available for selection by the remote UE; and code 2016 for communicating with the remote UE via one of the plurality of relay UEs. In certain aspects, the processor 2004 has circuitry configured to implement the code stored in the computer-readable medium/memory 2012. The processor 2004 includes circuitry 2018 for transmitting, to a remote user equipment (UE), relay selection assistance information identifying a plurality of relay UEs available for selection by the remote UE; and circuitry 2020 for communicating with the remote UE via one of the plurality of relay UEs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 15, 16, and 17 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 15, 16, and 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications at a user equipment (UE), comprising:
one or more memories comprising instructions; and
one or more processors, individually or collectively, configured to execute the instructions to cause the apparatus to:
receive, from a network entity, relay selection assistance information identifying a plurality of relay UEs available for selection by the UE;
select a first relay UE of the plurality of relay UEs based, at least in part, on the relay selection assistance information, wherein selecting the first relay UE of the plurality of relay UEs comprises selecting the first relay UE from a subset of the plurality of relay UEs, each relay UE in the subset being associated with a same cell as the UE and having a signal strength exceeding a threshold signal strength; and
connect, via a sidelink, to the selected first relay UE.

2. The apparatus of claim 1, wherein the relay selection assistance information is received in a discovery message.

3. The apparatus of claim 1, wherein the relay selection assistance information is received in a dedicated message received during a discovery procedure.

4. The apparatus of claim 1, wherein the relay selection assistance information is received in a system information block (SIB) broadcast to the UE by the network entity.

5. The apparatus of claim 1, wherein the relay selection assistance information comprises information related to UE-to-network entity relays, and wherein the relay selection assistance information is organized on a per-cell basis.

6. The apparatus of claim 5, wherein the relay selection assistance information for each cell comprises one or more of:

cell identifier information, cell load information, minimum quality of service (QOS) metrics supported by a link between a relay UE and the cell;

neighbor relay information;

a connection status of each neighbor relay;

public land mobile network (PLMN) information for the cell; or relay selection and reselection parameters for relay UEs connected with the cell.

7. The apparatus of claim 1, wherein the relay selection assistance information comprises information related to UE-to-UE relays that are in coverage of the network entity, and wherein the relay selection assistance information is organized on a per-UE basis.

8. The apparatus of claim 7, wherein the relay selection assistance information for each relay UE comprises one or more of:

information identifying the relay UE, cell identifier information for cells associated with the relay UE, cell load information for cells associated with the relay UE, minimum quality of service (QOS) metrics supported by a link between the relay UE and the cell;

neighbor relay information;

a connection status of each neighbor relay;

public land mobile network (PLMN) information for the cell associated with the relay UE; or relay selection and reselection parameters for the relay UE.

9. The apparatus of claim 1, wherein the one or more processors, individually or collectively, are configured to execute the instructions to cause the apparatus to:

adjust radio link monitoring (RLM) parameters for performing measurements in respect of the network entity where the UE is in a connected mode.

10. The apparatus of claim 1, wherein the one or more processors, individually or collectively, are configured to execute the instructions to cause the apparatus to:

establish a unicast connection with each relay UE in the subset of relay UEs.

11. The apparatus of claim 10, wherein the one or more processors, individually or collectively, are configured to execute the instructions to cause the apparatus to:

determine that a measured signal strength for a relay UE in the subset of relay UEs has fallen below the threshold signal strength;

based on at least the determination, send a sidelink medium access control (MAC) control element (CE) (MAC-CE) to activate the relay UE in the subset of relay UEs; and terminate the unicast connection for the relay UE in the subset of relay UEs.

12. The apparatus of claim 10, wherein the one or more processors, individually or collectively, are configured to execute the instructions to cause the apparatus to:

measure a signal strength of a connection with the selected first relay UE; and measure signal strength for only the subset of relay UEs based on a determination that the measured signal strength of the connection with the selected first relay UE exceeds the threshold signal strength.

13. The apparatus of claim 10, wherein the one or more processors, individually or collectively, are configured to execute the instructions to cause the apparatus to:

measure a signal strength of a connection with a relay UE having a lowest signal strength in the subset of relay UEs; and measure signal strength for only the subset of relay UEs based on a determination that the measured signal strength of the connection with the relay UE having the lowest signal strength in the subset of relay UEs exceeds the threshold signal strength.

14. The apparatus of claim 10, wherein the one or more processors, individually or collectively, are configured to execute the instructions to cause the apparatus to:

measure a signal strength of at least one of a connection with the selected first relay UE or a connection with a relay UE having a lowest signal strength in the subset of relay UEs; and measure signal strength for the plurality of relay UEs based on a determination that at least one of the measured signal strength of the connection with the selected first relay UE or the measured signal strength of the connection with the relay UE having a lowest signal strength in the subset of relay UEs is less than the threshold signal strength.

15. The apparatus of claim 10, wherein the one or more processors, individually or collectively, are configured to execute the instructions to cause the apparatus to:

determine that a signal strength of a connection with the selected first relay UE has fallen below a threshold signal strength; and based on the determination:

release the connection with the selected first relay UE; and activate a connection with a second relay UE of the subset of relay UEs via a sidelink medium access control (MAC) control element (CE) (MAC-CE), wherein second relay UE comprises a UE of the subset of relay UEs having a highest connection signal strength.

16. The apparatus of claim 10, wherein the one or more processors, individually or collectively, are configured to execute the instructions to cause the apparatus to:

determine that a signal strength of a connection with the selected first relay UE has fallen below a threshold signal strength and that no relay UE in the subset of relay UEs is suitable for reselection; and based on the determination:

release the connection with the selected first relay UE; and trigger a cell reselection procedure.

17. The apparatus of claim 1, wherein the one or more processors, individually or collectively, are configured to execute the instructions to cause the apparatus to adjust radio resource management (RRM) parameters for performing measurements in respect of the network entity and one or more neighboring network entities where the UE is in an idle, inactive, or connected mode using a first set of adjusted RRM parameters for the network entity and a second set of adjusted RRM parameters for the one or more neighboring network entities.

18. A method for wireless communications at a user equipment (UE), comprising:

receiving, from a network entity, relay selection assistance information identifying a plurality of relay UEs available for selection by the UE;

selecting a first relay UE of the plurality of relay UEs based, at least in part, on the relay selection assistance information, wherein selecting the first relay UE of the plurality of relay UEs comprises selecting the first relay UE from a subset of the plurality of relay UEs, each relay UE in the subset being associated with a same cell as the UE and having a signal strength exceeding a threshold signal strength; and connecting, via a sidelink, to the selected first relay UE.

* * * * *